United States Patent
Adams et al.

(10) Patent No.: US 9,372,680 B2
(45) Date of Patent: Jun. 21, 2016

(54) METHODS AND SYSTEMS FOR PRODUCING, EVALUATING AND SIMULATING EXECUTABLE APPLICATIONS

(71) Applicants: Jeremy Adams, Exeter (GB); David Poston, London (GB)

(72) Inventors: Jeremy Adams, Exeter (GB); David Poston, London (GB)

(73) Assignee: Marmalade Technologies Limited, a United Kingdom Private Limited Company, London (GB)

( * ) Notice: Subject to any disclaimer, the term of this patent is extended or adjusted under 35 U.S.C. 154(b) by 0 days.

(21) Appl. No.: 14/197,576

(22) Filed: Mar. 5, 2014

(65) Prior Publication Data

US 2014/0189679 A1    Jul. 3, 2014

Related U.S. Application Data

(63) Continuation of application No. PCT/EP2012/067346, filed on Sep. 5, 2012.

(30) Foreign Application Priority Data

| | | |
|---|---|---|
| Sep. 8, 2011 | (GB) | 1115501.7 |
| Oct. 3, 2011 | (GB) | 1117001.6 |
| Nov. 4, 2011 | (GB) | 1119103.8 |

(51) Int. Cl.
  *G06F 9/45* (2006.01)
  *G06F 9/44* (2006.01)
  *G06F 9/445* (2006.01)

(52) U.S. Cl.
  CPC .. *G06F 8/60* (2013.01); *G06F 8/61* (2013.01); *G06F 9/44578* (2013.01); *G06F 8/41* (2013.01); *G06F 8/443* (2013.01); *G06F 8/54* (2013.01); *G06F 9/44521* (2013.01)

(58) Field of Classification Search
  CPC ............... G06F 8/30; G06F 8/31; G06F 8/34; G06F 8/35; G06F 8/41; G06F 8/54; G06F 8/443; G06F 9/44521
  See application file for complete search history.

(56) References Cited

U.S. PATENT DOCUMENTS

| | | | |
|---|---|---|---|
| 8,464,349 B2* | 6/2013 | Yee | G06F 21/53 717/140 |
| 2003/0005425 A1* | 1/2003 | Zee | G06F 8/41 717/166 |

(Continued)

OTHER PUBLICATIONS

Shane Fleming et al., System-level linking of synthesised hardware and compiled software using a higher-order type system, ACM Feb. 2015, retrieved online on Apr. 11, 2016, pp. 1-4. Retrieved from the Internet: <URL: http://cas.ee.ic.ac.uk/people/gac1/pubs/ShaneFPGA15.pdf>.*

(Continued)

*Primary Examiner* — Thuy Dao
*Assistant Examiner* — Hanh T Bui
(74) *Attorney, Agent, or Firm* — David G. Oberdick; Michael G. Monyok

(57) ABSTRACT

A method and system for producing executable applications comprises selecting a processor type and compiling a binary code module for execution by the selected processor type. The method and system further comprise selecting one or more operating systems and linking the binary code module with a loader module for each selected operating system to produce an executable application to be executed on that operating system. Methods and systems for evaluating and simulating executable applications are also disclosed.

23 Claims, 9 Drawing Sheets

(56) References Cited

U.S. PATENT DOCUMENTS

| | | | | |
|---|---|---|---|---|
| 2005/0289531 | A1* | 12/2005 | Illowsky | G06F 1/3203 717/163 |
| 2006/0129972 | A1* | 6/2006 | Tyburski | G06F 8/61 717/106 |
| 2007/0240136 | A1* | 10/2007 | Garyali | G06F 9/468 717/140 |
| 2007/0266381 | A1* | 11/2007 | Kaushik | G06F 9/44521 717/162 |
| 2008/0127088 | A1 | 5/2008 | Harmsen et al. | |
| 2008/0127171 | A1 | 5/2008 | Tarassov | |
| 2010/0088669 | A1* | 4/2010 | Cwalina | G06F 8/73 717/106 |
| 2010/0100591 | A1 | 4/2010 | Mahaffey et al. | |
| 2013/0326489 | A1* | 12/2013 | Eijndhoven | G06F 9/45508 717/139 |
| 2014/0089905 | A1* | 3/2014 | Hux | G06F 8/24 717/140 |

OTHER PUBLICATIONS

Richard Wartell et al., Securing Untrusted Code via Compiler-Agnostic Binary Rewriting, ACM Dec. 2012, retrieved online on Apr. 11, 2016, pp. 299-308. Retrieved from the Internet: <URL: http://delivery.acm.org/10.1145/2430000/2420995/p299-wartell.pdf?>.*

International Search Report and Written Opinion for International Application PCT/EP2012/067346 dated Jan. 30, 2013.

Oliver, Ramon Serna et al., Poster Abstract: An efficient operating system abstraction layer for portable applications in the domain of wireless sensor networks, Proceedings of the 7th ACM Conference on Embedded Networked Sensor Systems, pp. 379-380, ISBN: 978-1-60-558519-2, ACM, 2009.

* cited by examiner

```
// Main entry point for the application
int main()
{
    // Wait for a quit request from the host OS
    while (!s3eDeviceCheckQuitRequest())
    {
        // Fill background blue
        s3eSurfaceClear(0, 0, 255);

// Print a line of debug text to the screen at top left (0,0)
        s3eDebugPrint(120, 150, "`xffffffHello, World!", 0);

// Flip the surface buffer to screen
        s3eSurfaceShow();

// Sleep for 0ms to allow the OS to process events etc.
        s3eDeviceYield(0);
    }
    return 0;
}
```

METHODS AND SYSTEMS FOR PRODUCING, EVALUATING AND SIMULATING EXECUTABLE APPLICATIONS

CROSS-REFERENCE TO RELATED APPLICATIONS

This application is a Continuation application of PCT International Application Number PCT/EP2012/067346, titled METHODS AND SYSTEMS FOR PRODUCING, EVALUATING AND SIMULATING EXECUTABLE APPLICATIONS, filed Sep. 5, 2012, and claims priority to foreign patent applications GB1115501.7, titled A METHOD AND SYSTEM FOR PRODUCING EXECUTABLE APPLICATIONS, filed Sep. 8, 2011, GB1117001.6, titled A METHOD AND SYSTEM FOR EVALUATING EXECUTABLE APPLICATIONS, filed Oct. 3, 2011, and GB1119103.8, titled A METHOD AND ARRANGEMENT FOR SIMULATING EXECUTION OF AN EXECUTABLE APPLICATION, filed Nov. 4, 2011, all incorporated by reference herein in their entirety.

FIELD OF THE DISCLOSURE

The present invention relates to a method and system for producing executable applications, and more particularly relates to a method and system for producing executable applications to be executed on different devices running different operating systems.

The present invention also relates to a method and system for evaluating executable applications, and more particularly relates to a method and system for evaluating executable applications produced for different devices on a host system.

The present invention also relates to a method and arrangement for simulating execution of an executable application, and more particularly relates to a method and arrangement for simulating execution of an executable application using a host system and a target device.

BACKGROUND OF THE DISCLOSURE

Many application developers require their applications or "apps" to run across multiple operating systems. Each operating system provider typically provides a Software Development Kit (SDK) allowing applications to be developed only for the provider's specific operating system. Developers have two options:

Option 1: Develop for each target operating system (OS) using each respective OS-specific SDK. The problem with this option is that is can be expensive and time-consuming: each OS-specific SDK environment requires domain knowledge; the SDK environments mandate different programming languages (C++, C#, Objective-C, Java, etc.); each implementation must be separately tested, etc.

Option 2: Develop for multiple target OSs simultaneously by using a "cross-platform" SDK. A cross-platform approach allows developers to maintain a single body of source code, whilst still being able to compile and deploy to multiple target OS platforms. Cross-platform SDKs are generally provided by Independent Software Vendors (ISVs) rather than the OS providers. The number of ISVs providing Option 2 is increasing because Option 1 is becoming more expensive and time-consuming.

Each cross-platform SDK presents the developer with an abstracted Application Programming Interface (API) set (the "OS abstraction API") allowing a single application source code to target multiple OS environments. The application source code is usually prevented from referencing OS-specific APIs; the application's only interaction with the OS must be through the abstracted APIs.

There are three conventional variations on the cross-platform SDK approach:

Variation A: Virtual Machine (VM). Source code is authored in a language such as JavaScript, Java or C#. The source code is compiled to a "bytecode" instruction set for delivery to a target device. The bytecode is not "machine code" native to any specific CPU.

The target device contains a runtime "interpreter" for the bytecode (this interpreter may itself be bundled and delivered with the app, or it may already be resident on the target device). This interpreter is known as a Virtual Machine (VM). Typically the SDK provider will provide a separate version of the VM for each target OS.

When the application is executed, the bytecode is interpreted by the VM and converted into machine code native to the CPU of the device. This conversion process can happen on-the-fly every time each bytecode instruction is interpreted; or "Just In Time" (JIT) by interpreting a block of instructions, converting to machine code, and caching the resulting code in memory so that it does not need to be converted again within the same execution of the application; or "Ahead Of Time" (AOT) by applying the JIT process to the entire bytecode as soon as the application is launched (this is the most time-consuming and memory-intensive approach).

The Variation A approach requires only one compilation of the source code (to the VM bytecode), and everything else is handled at application execution time by the VM. Examples include J2ME (from Oracle), Flash (from Adobe) and .NET (or the "Common Language Runtime", from Microsoft).

Variation A provides the purest form of binary portability, but at the expense of runtime performance. Interpreted code is slower than pre-compiled code, and yet conducting the code compilation process on the target device (either JIT or AOT) itself impacts performance.

Variation B: Transcoding, or Code Morphing. Source code can be authored in a variety of languages. Standard compilers such as the CodeSourcery GCC compiler are comprised of stages. Typically one stage (the "front end") compiles the source code into an intermediary binary code; another stage (the "back end") then compiles the intermediary binary code into executable code for the target application execution environment, which might be machine code native to a specific CPU, or might be a bytecode for a VM.

The Code Morphing approach typically extracts the intermediary binary code from the first stage of the compilation process, and then decompiles this binary code into a source code target native to an OS-specific SDK. For example, the source code might be authored in Java; the GCC compiler front end would convert this into intermediary binary code; the cross-platform SDK might then extract the binary code and decompile it into Objective-C in a manner suitable for recompilation within the Apple iPhone SDK. The cross-platform SDK would support decompilation into multiple OS-specific source codes, and the developer would then be responsible for compiling these within multiple OS-specific SDKs in order to generate "native" applications for all of the desired targets.

This approach requires multiple separate compilations of the automatically-generated OS-specific source code, and therefore requires the developer to install multiple OS-specific SDKs. Examples include MoSync (from Mobile Sourcery) and Metismo (from Software AG).

Variation B does not require any on-device code interpretation, but the process of decompiling the intermediary compiler binary code, and recompiling within the OS-specific SDK, results in code which is far from optimally-performant. Furthermore, the auto-generation of OS-specific source code from the developer's original source code makes source code management more complex; there is a temptation for the developer to modify the auto-generated source code, and these modifications can be lost if the auto-generation process is repeated. Finally, this approach requires the auto-generated code to be compiled separately within each OS-specific SDK environment. The resultant versions of the application are very different in terms of CPU machine code, and therefore the likelihood of OS-specific bugs is increased.

Variation C: Source Code Compatibility. This is in some ways the simplest approach. The cross-platform SDK presents the developer with a set of programming interfaces that have been implemented separately within each OS-specific SDK. The developer can then simply compile their application source code, combined with the cross-platform SDK implementation, within the OS-specific SDK environment in order to generate an application for the target OS. This approach requires multiple separate compilations of the application source code, and therefore requires the developer to install multiple OS-specific SDKs. However, the main flaw of this approach is that the developer source code can only be compiled within OS-specific SDKs that accept that source code language choice. For example, source code authored in Java could be compiled within Google's Android SDK, but not within Apple's iPhone SDK. Examples include Qt (from Nokia); many developers also create their own in-house solutions using this approach.

Variation C is the best in terms of compiled code performance, as the code compiler provided by each OS-specific SDK can be utilised as intended, with all compiler optimisations applied. However, the source code still needs to be compiled separately within each OS-specific SDK environment, and resultant versions of the application are very different in terms of CPU machine code, with the likelihood of OS-specific bugs being increased. The major downside is that the number of supportable OS platforms is highly restricted, as the developer must make a single choice of source code language, yet currently many of the most popular target OS platforms have OS-specific SDKs that mandate a single and differing source code language choice.

There is a need for a new approach to cross-platform application development that achieves an optimal balance of binary code portability with high runtime performance.

The present invention seeks to provide an improved method of producing executable applications.

The present invention seeks to provide an improved method and system for evaluating executable applications.

A common convenient method of evaluating applications is to run a version of the application on the host development system. Given the configuration of the host development system, this evaluation may be within a processor architecture and operating system that differs from all or most of the target devices. Such an evaluation can be termed a "simulation". Furthermore, the hardware form factor of the host development system is likely to differ considerably from that of all or most of the target devices; for example, the host development system may receive inputs from a mouse and alphanumeric keyboard, whilst the target devices might receive inputs from a touchscreen and a small number of specific buttons.

The present invention seeks to provide an improved method and arrangement for simulating execution of an executable application.

SUMMARY OF THE DISCLOSURE

According to one aspect of the present invention, there is provided a method of producing an executable application, the method comprising selecting a processor type, generating a code module comprising instructions which are executable by the selected processor type, selecting an operating system, providing a loader module for execution by the selected operating system, and packaging the loader module with the code module to form an executable application so that, when the executable application is provided on a device incorporating a processor of the selected processor type and running the selected operating system, the device can execute the executable application to execute the loader module to load the code module for execution by the processor.

According to another aspect of the present invention, there is provided a method of producing executable applications comprising selecting a processor type, generating a code module comprising instructions which are executable by the selected processor type, selecting a first operating system, providing a first loader module for execution by the selected first operating system, packaging the first loader module with the code module to form a first executable application so that, when the first executable application is provided on a first device incorporating a processor of the selected processor type and running the selected first operating system, the first device can execute the first executable application to execute the first loader module to load the code module for execution by the processor, selecting a second operating system, providing a second loader module for execution by the selected second operating system, and packaging the second loader module with a copy of the code module to form a second executable application so that, when the second executable application is provided on a second device incorporating a processor of the selected processor type and running the selected second operating system, the second device can execute the second executable application to execute the second loader module to load the copy of the code module for execution by the processor.

Preferably, the method further comprises linking each code module to a respective loader module.

Conveniently, the linking occurs before or at the same time as the loader module is packaged with the code module to form an executable application.

Advantageously, the method further comprises copying the or each executable application to a device.

In one embodiment the linking occurs each time the or each executable application is executed on the device.

In another embodiment the linking links the code module to an operating system abstraction application programming interface provided in the loader module.

In a further embodiment the linking links the code module to one or more device drivers.

Preferably, the method further comprises generating a loader module for each respective selected operating system.

Conveniently, generating each loader module comprises incorporating an operating system abstraction application programming interface header.

Advantageously, generating each loader module comprises incorporating generic functional code which can be executed by more than one operating system.

Preferably, generating each loader module comprises incorporating functional code which is specific to a selected operating system.

Conveniently, the code module is machine code and the step of generating the code module comprises compiling the machine code from source code using a compiler for a selected processor type.

Advantageously, the code module incorporates a single function entry point to initiate execution of the code module.

Preferably, the code module has an external dependency to an operating system abstraction application programming interface.

Conveniently, the code module has an external dependency on at least one device driver.

Advantageously, generating the code module comprises using an object file linker to link a machine code object file into a binary library file in an executable and linkable format.

Preferably, generating the code module further comprises modifying the executable and linkable format library file into a format suitable for linking with the loader module.

Conveniently, the step of packaging comprises storing each code module with a respective loader module in a single executable application file.

Advantageously, the step of packaging further comprises storing application assets in the single executable application file.

Preferably, the step of packaging further comprises storing metadata in the single executable application file.

Conveniently, the processor is a central processing unit of a device.

Advantageously, the or each device is an embedded device incorporating an embedded processor.

In one embodiment the processor is of Intel x86 architecture.

In another embodiment the processor is of ARM architecture.

In a further embodiment the processor is of MIPS architecture.

In a further embodiment at least one of the selected operating systems is a Linux-based operating system.

In a still further embodiment at least one of the selected operating systems is an Android operating system.

In a yet further embodiment at least one of the selected operating systems is a MeeGo operating system.

In another embodiment at least one of the selected operating systems is a Windows operating system.

In yet another embodiment at least one of the selected operating systems is an iOS operating system.

According to a yet further aspect of the present invention, there is provided a system for producing an executable application, the system comprising an interface for selecting a processor type and an operating system, a compiler to generate a code module comprising instructions which are executable by a processor type selected using the interface, a storage module for storing a loader module configured for execution by an operating system selected using the interface, and a packaging module for packaging the loader module with the code module to form an executable application so that, when the executable application is provided on a device incorporating a processor of the selected processor type and running the selected operating system, the device can execute the executable application to execute the loader module to load the code module for execution by the processor.

According to a still further aspect of the present invention, there is provided a system for producing an executable application, the system comprising an interface for selecting a processor type, a first operating system and a second operating system, a compiler to generate a code module comprising instructions which are executable by a processor type selected using the interface, a storage module for storing a first loader module configured for execution by a first operating system selected using the interface and a second loader module configured for execution by a second operating system selected using the interface, and a packaging module which is configured to package the first loader module with the code module to form a first executable application so that, when the first executable application is provided on a device incorporating a processor of the selected processor type and running the selected first operating system, the device can execute the first executable application to execute the first loader module to load the code module for execution by the processor, wherein the packaging module is also configured to package the second loader module with a copy of the code module to form a second executable application so that, when the second executable application is provided on a device incorporating a processor of the selected processor type and running the selected second operating system, the device can execute the second executable application to execute the second loader module to load the code module for execution by the processor.

Preferably, the system further comprises a linker module which is configured to link each code module to a respective loader module.

According to another aspect of the present invention, there is provided a device comprising at least one executable application produced in accordance with the method of any one of claims 1 to 31 hereinafter.

In one embodiment the device is a mobile telephone.

In another embodiment the device is a tablet computer.

In a further embodiment the device is a laptop computer.

In a still further embodiment the device is a television.

In a yet further embodiment the device is a set-top box.

According to one aspect of the present invention, there is provided a method of evaluating an executable application on a host system, wherein the host system incorporates a memory and a first processor type, and wherein the application comprises a loader module configured to execute on the host system and a code module configured to execute on a second processor type which is different from the first processor type, the method comprising: executing the loader module on the host system, executing an emulator module to provide an emulation environment on the host system which emulates the second processor type, executing the code module within the emulation environment to generate a functional command, writing the functional command into the memory of the host system, and executing the functional command within the loader module.

Preferably, the emulator module is executed in response to the loader module generating a functional call to the code module.

Conveniently, the emulator module generates an exception signal when the functional command is written into the memory.

Advantageously, the loader module executes the functional command in response to the generation of the exception signal.

Preferably, the loader module and the emulator module share the same memory space in the host system.

Conveniently, the method further comprises passing execution back to the code module in the emulation environment after the functional command has been executed within the loader module.

In one embodiment the operating system of the host system is a Windows operating system.

In another embodiment the operating system of the host system is an OSX operating system.

In a further embodiment the operating system of the host system is a Linux operating system.

Preferably, one of the processor types is x86.

Conveniently, one of the processor types is ARM.

Advantageously, one of the processor types is MIPS.

In one embodiment the emulator module is a QEMU emulator.

In another embodiment the method further comprises initially producing the application by selecting the second processor type, generating the code module comprising instructions which are executable by the second processor type, providing the loader module for execution by the operating system of the host system, and packaging the loader module with the code module to form the executable application.

Preferably, the method further comprises linking the code module to the loader module.

Conveniently, the linking occurs before or at the same time as the loader module is packaged with the code module to form an executable application.

Advantageously, the linking links the code module to an operating system abstraction application programming interface provided in the loader module.

Preferably, the linking links the code module to one or more device drivers.

Conveniently, the code module is machine code and the step of generating the code module comprises compiling the machine code from source code using a compiler for a selected processor type.

Advantageously, the code module incorporates a single function entry point to initiate execution of the code module.

Preferably, the code module has an external dependency to an operating system abstraction application programming interface.

Conveniently, the code module has an external dependency on at least one device driver.

Advantageously, generating the code module comprises using an object file linker to link a machine code object file into a binary library file in an executable and linkable format.

Preferably, generating the code module further comprises modifying the executable and linkable format library file into a format suitable for linking with the loader module.

Conveniently, the step of packaging comprises storing each code module with a respective loader module in a single executable application file.

Advantageously, the step of packaging further comprises storing application assets in the single executable application file.

Preferably, the step of packaging further comprises storing metadata in the single executable application file.

According to another aspect of the present invention, there is provided a system for evaluating executable applications, the system comprising: a memory, a processor of a first processor type, and an emulator module which, when executed, provides an emulation environment which emulates a second processor type which is different from the first processor type, wherein the system is configured to: execute a loader module of an application, execute the emulator module to provide an emulation environment which emulates the second processor type, execute a code module of the application within the emulation environment to generate a functional command, write the functional command into the memory of the system, and execute the functional command within the loader module.

Preferably, the system is configured to execute the emulator module in response to the loader module generating a functional call to the code module.

Conveniently, the emulator module is configured to generate an exception signal when the functional command is written into the memory.

Advantageously, the loader module is configured to execute the functional command in response to the generation of the exception signal.

Preferably, the loader module and the emulator module share the same memory space.

Conveniently, the system is configured to pass execution back to the code module in the emulation environment after the functional command has been executed within the loader module.

In one embodiment the system is configured to run a Windows operating system.

In another embodiment the system is configured to run an OSX operating system.

In a further embodiment the system is configured to run a Linux operating system.

Preferably, one of the processor types is x86.

Conveniently, one of the processor types is ARM.

Advantageously, one of the processor types is MIPS.

In one embodiment the emulator module is a QEMU emulator.

Preferably, the system further comprises a system for producing an executable application which incorporates: an interface for selecting a processor type and an operating system, a compiler to generate a code module comprising instructions which are executable by a processor type selected using the interface, a storage module for storing a loader module configured for execution by an operating system selected using the interface, and a packaging module for packaging the loader module with the code module to form an executable application so that, when the executable application is provided on a device incorporating a processor of the selected processor type and running the selected operating system, the device can execute the executable application to execute the loader module to load the code module for execution by the processor.

Conveniently, the system further comprises a linker module which is configured to link the code module to the loader module.

According to one aspect of the present invention, there is provided a method of simulating execution of an executable application using a host system, the method comprising providing a host system with an executable application comprising host loader module and a host code module, providing a target device with a target interface module, establishing a communication link between the host system and the target device, executing the executable application on the host system so that the host code module generates a functional command, passing the functional command from the host code module to the host loader module, communicating the functional command from the host loader module to the target interface module, executing the functional command on the target device, generating a result value on the target device and passing the result value to the target interface module, and communicating the result value from the target interface module to the host loader module to return the result value for input to the executable application running on the host system.

Preferably, the target device is provided with a target loader module and wherein the method further comprises communicating the functional command from the target interface module to the target loader module, and the step of executing the functional command comprises: executing the functional command within the target loader module.

Conveniently, the method further comprises: receiving at least one input at the target device and using the at least one input to generate the result value.

Advantageously, the target device incorporates a touchscreen to receive the at least one input.

Preferably, the target device incorporates at least one button to receive the at least one input.

Conveniently, the target device incorporates a microphone to receive the at least one input.

Advantageously, the target device incorporates at least one sensor to receive the at least one input.

Preferably, the or each sensor is selected from a group consisting of an accelerometer, a positioning sensor, a proximity sensor, a magnetometer, a thermometer and a video camera.

Conveniently, the target device incorporates a screen and the method further comprises: generating display data within the host system, transmitting the display data to the target device, and outputting the display data by displaying elements on the screen of the target device.

Advantageously, the displayed elements are substantially identical to elements that would be displayed on the screen of the target device if the executable application was running on the target device.

Preferably, the operating system of the host system is a Windows operating system.

Conveniently, the operating system of the host system is an OSX operating system.

Advantageously, the operating system of the host system is a Linux-based operating system.

Preferably, the operating system of the target device is an Android operating system.

Conveniently, the operating system of the target device is an iOS operating system.

Advantageously, wherein the operating system of the target device is a Windows operating system.

Preferably, the operating system of the target device is a Linux-based operating system.

Conveniently, the operating system of the host system is different from the operating system of the target device.

Advantageously, the host system incorporates an x86 central processing unit.

Preferably, the host system incorporates an ARM central processing unit.

Conveniently, the host system incorporates a MIPS central processing unit.

Advantageously, the target device incorporates an x86 central processing unit.

Preferably, the target device incorporates an ARM central processing unit.

Conveniently, the target device incorporates a MIPS central processing unit.

Advantageously, the host system and the target device each incorporate a respective central processing unit and wherein the central processing units are of a different type to one another.

Preferably, the communication link between the host system and the target device is a wireless communication link.

Conveniently, the communication link between the host system and the target device is a wired communication link.

Advantageously, the method further comprises initially producing the executable application by: generating the host code module comprising instructions which are executable by a central processing unit of the host system, providing the host loader module for execution by the operating system of the host system, and packaging the host loader module with the host code module to form the executable application.

According to another aspect of the present invention there is provided an arrangement for simulating execution of an executable application using a host system, wherein the arrangement comprises: a host system which is provided with an executable application comprising host loader module and a host code module, a target device incorporating a target interface module, and a communication arrangement for establishing a communication link between the host system and the target device, the host system being configured to execute the executable application so that the host code module generates a functional command and passes the functional command from the host code module to the host loader module, the communication arrangement being configured to communicate the functional command from the host loader module to the target interface module for execution on the target device, wherein the target device is configured to generate a result value, pass the result value to the target interface module and communicate the result value from the target interface module to the host loader module to return the result value for input to the executable application running on the host system.

Preferably, the target device is provided with a target loader module and wherein the target device is configured to communicate the functional command from the target interface module to the target loader module for execution within the target loader module.

Conveniently, the target device is configured to receive at least one input and use the at least one input to generate the result value.

Advantageously, wherein the target device incorporates a touchscreen to receive the at least one input.

Preferably, the target device incorporates at least one button to receive the at least one input.

Conveniently, the target device incorporates a microphone to receive the at least one input.

Advantageously, the target device incorporates at least one sensor to receive the at least one input.

Preferably, the or each sensor is selected from a group consisting of an accelerometer, a positioning sensor, a proximity sensor, a magnetometer, a thermometer and a video camera.

Conveniently, the target device incorporates a screen and wherein the host system is configured to generate display data and transmit the display data to the target device and the target device is configured to output the display data by displaying elements on the screen of the target device.

Advantageously, the displayed elements are substantially identical to elements that would be displayed on the screen of the target device if the executable application was running on the target device.

Preferably, the operating system of the host system is a Windows operating system.

Conveniently, the operating system of the host system is an OSX operating system.

Advantageously, the operating system of the host system is a Linux-based operating system.

Preferably, the operating system of the target device is an Android operating system.

Conveniently, the operating system of the target device is an iOS operating system.

Advantageously, the operating system of the target device is a Windows operating system.

Preferably, the operating system of the target device is a Linux-based operating system.

Conveniently, the operating system of the host system is different from the operating system of the target device.

Advantageously, the host system incorporates an x86 central processing unit.

Preferably, the host system incorporates an ARM central processing unit.

Conveniently, the host system incorporates a MIPS central processing unit.

Advantageously, the target device incorporates an x86 central processing unit.

Preferably, the target device incorporates an ARM central processing unit.

Conveniently, the target device incorporates a MIPS central processing unit.

Advantageously, the host system and the target device each incorporate a respective central processing unit and wherein the central processing units are of a different type to one another.

Preferably, the communication arrangement between the host system and the target device is a wireless communication arrangement.

Conveniently, the communication arrangement between the host system and the target device is a wired communication arrangement.

BRIEF DESCRIPTION OF THE DRAWINGS

In order that the invention may be more readily understood, and so that further features thereof may be appreciated, embodiments of the invention will now be described, by way of example, with reference to the accompanying drawings in which:

FIG. 5A shows the C source code of an example App Binary;

FIG. 5B shows a disassembly of the App Binary source code shown in FIG. 5A when the source code is compiled to run on an ARM processor.

DETAILED DESCRIPTION OF THE DRAWINGS

Figure 1:
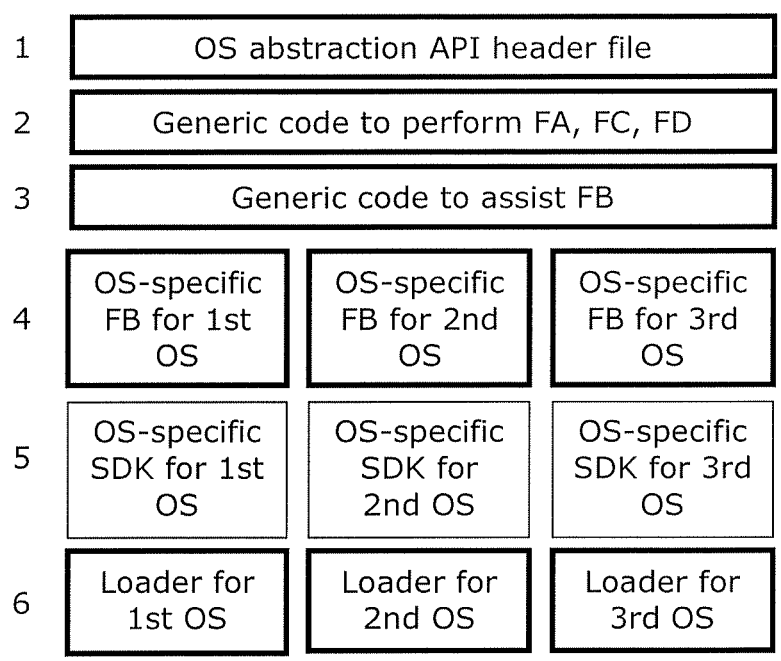
FIG. 1 is a flow diagram showing the creation of Loaders for three different OSs by an ISV.

The inventors of the present invention noted that the variance in the number of target CPU architecture families is small. Popular CPU architectures include Intel's x86 architecture, ARM's architecture, and the MIPS architecture. If one considers only one target device sector, for instance embedded devices (including smartphones and tablets) then in general the variance is even smaller (in the embedded case, over 90% of devices use the ARM architecture).

Embodiments of the present invention use the concept of binary code library linkage, whereby separate areas of application functionality can be compiled separately into multiple code libraries, and later linked together to form a single executable application. Each library advertises its linkage points through a table of "function entry points" (points that other libraries can link to) and "external dependencies" (points that the library itself is requiring linkage to). Embodiments of the invention can operate using both "static linking", whereby the linkage step is performed at application deployment time, or "dynamic linking", whereby the linkage step is performed each time the application is executed.

Embodiments of the invention allow an application to be compiled as a code module which is preferably a CPU-dependent, but OS-agnostic, binary code library (an "App Binary"), allowing the developer to leverage all optimisations available from supporting compilers. The code module will be referred to as an App Binary in the following description.

The App Binary code library advertises a single function entry point, the "main" function, which would be called to initiate execution of the application. The library has two sets of external dependencies:

ED1: External dependencies to an OS abstraction API. As described above, the application source code can never reference OS-specific APIs; its only interaction with the OS must be through the abstracted APIs.

ED2: External dependencies to device drivers that are commonly expected to be present on all of the target devices.

Because the App Binary has no OS-specific dependencies, it is entirely portable across OS platforms. The App Binary is compiled CPU machine code, so it has a dependency on the CPU architecture choice of the compiler: for example, an App Binary compiled using the GCC ARM compiler (with the appropriate settings) could run on almost any embedded device utilising an ARM CPU, but could not run on a device utilising an Intel x86 CPU.

The App Binary cannot be executed in isolation, as it has external dependencies. Embodiments of the invention therefore provide a second component, the "Loader". A Loader is provided for each target OS, and in each case it is a standard OS-specific application containing the following functionality:

FA: Ability to load the App Binary into memory,

FB: An implementation of the OS abstraction API for the host OS within which the Loader is executing, FC: Ability to dynamically link the external dependencies (1) to the implementation (B), and FD: Ability to dynamically link the external dependencies (2) to any industry-standard drivers that are commonly expected to be present on all of the target devices This design enables all OS-specific code to reside within the Loaders. The Loaders are provided within the SDK itself, so have been pre-compiled using the OS-specific SDKs in each case. The application developer is not required to compile the source code for the Loaders (and may not even be provided with such source code), which have to be maintained using the specific code language choices mandated by the OS providers. Because the App Binary requires no knowledge of the Loader it might be linked to, it is free to be compiled within a toolchain entirely independent of any OS-specific mandate, and the application source code language choice is similarly independent.

Embodiments of the invention may produce executable applications for use with operating systems selected from a group consisting of iOS, Android, Windows, MeeGo and webOS. However, it is to be appreciated that further embodiments of the invention may produce executable applications for use with any other operating system.

Loader Creation

Referring now to FIG. 1 of the accompanying drawings, a Loader for three different OSs is created as follows:

1. The OS abstraction API implemented by each Loader is defined by a single source code header file, or series of header files, which are shared across all Loaders.

2. Functionalities FA, FC and FD are common across all target OS platforms. Therefore the code to implement these functionalities is generic, and shared between all Loaders.

3. Some subsets of the functionalities of FB may be common across some target OS platforms. For example, target OS platforms based on Linux (including Android, webOS and MeeGo) may be able to share some code related to subsets of FB.

4. The bulk of the functionalities of FB will be specific to the target OS platform, and make use of APIs that are provided only by that OS platform's specific SDK.

5. Each target OS platform will provide a standard SDK that can be used to build applications for execution on that target OS. The Loader for each target OS must be compiled using this standard SDK.

6. The end result of compiling 1, 2, 3 and 4 within the relevant OS-specific SDK 5 will be the Loader for the respective target OS.

App Binary Creation

Figure 2:
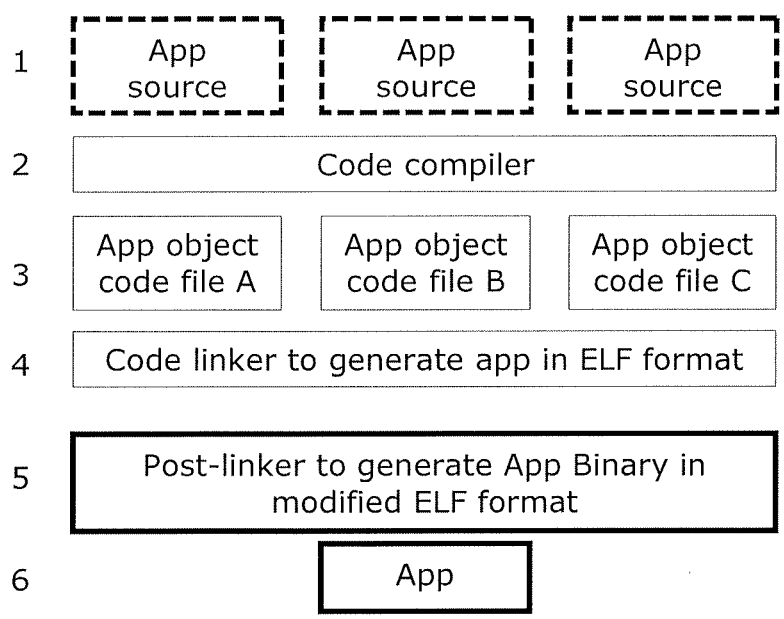
FIG. 2 is a flow diagram showing the creation of an App Binary.

Referring now to FIG. 2 of the accompanying drawings, an App Binary is created as follows:

1. A developer's application consists of standard source code and header files. Function calls to the OS abstraction API require the inclusion of the header file describing that API. Function calls to industry-standard drivers expected to be on the target device require the inclusion of the header files describing those drivers APIs.

2. A code compiler (for example, the CodeSourcery GCC compiler) is used to compile the application source code into native CPU instructions for the target CPU architecture.

3. In general, each source code file gives rise to a single binary "object file".

4. An object file linker (for example, the CodeSourcery GCC linker) is used to link the binary object files together into a single binary library file. At this stage, the library file will be in an Executable and Linkable Format (ELF) that is the output from the linker tool. ELF files contain the compiled code and structural information which enables the code to be loaded at any memory address and linked to other libraries.

5. A "post-linker" tool is provided to modify the standard ELF file into a form more suitable for linking with the Loader. For example, standard ELF files are required to be "seeked" upon loading—this means that if the standard ELF is compressed, if must be entirely decompressed into memory before it can start to be read. This can be impractical when loading large ELF files on memory-constrained devices. The modified ELF file does not require seeking: the entire file can be compressed, and when loaded it can be decompressed section-by-section. The modified ELF file is typically 20%-40% the size of the standard ELF file.

6. The end result of the process is an App Binary which is in modified ELF format.

Once the App Binary and Loader have been created, the two can be deployed for execution on a target device. Three deployment configurations will now be discussed below.

Deployment with Static Linking

Figure 3A:
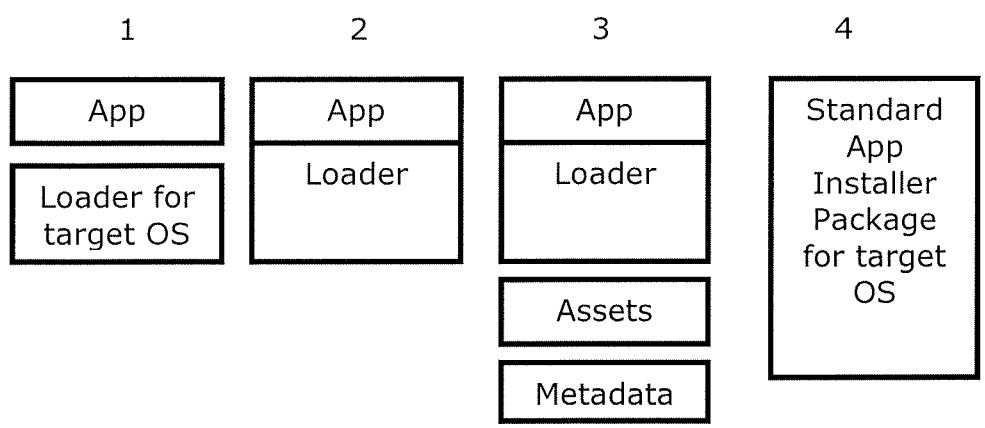
FIG. 3A is a flow diagram showing deployment of an application in which a Loader is statically linked to an App Binary at deployment time.

Referring now to FIG. 3A of the accompanying drawings, an App Binary can be statically linked to the Loader at deployment time as follows:

1. The App Binary is created from the developer's source code, as shown in FIG. 2. The Loader for the target OS has already been built by the ISV as shown in FIG. 1, and is provided to the developer within the SDK. The Loader is a an executable application, as understood by the target OS.

2. The App Binary is statically linked with the Loader using an offline tool provided within the SDK. The linkage process is identical to that indicated in FB.

3. The application assets (or "resources"), including images, fonts, text strings, and any other data files used by the application, are placed alongside the statically linked executable code. The application metadata required by the target OS, including the application name, desktop icons in various sizes, manifests and other required files, are also placed alongside.

4. All the files aforementioned are bundled into a standard application installer package, as defined by the target OS. This bundling process may involve file compression, and usually involves use of tools from within the OS-specific SDK. However, these tools are usually made available under permissive licenses enabling them to be redistributed within the ISV SDK for the developer's convenience. Finally, the application installer package may be "signed" or encrypted using a process proscribed by the OS vendor. Again, these signing tools are often able to be redistributed within the ISV SDK.

The end result is a standard application installer package for the target OS, that can either be deployed directly to the target device, or hosted for distribution to the target device, for example on an "app store"; no additional ISV software is required to be resident on the target device.

Deployment with Dynamic Linking

Figure 3B:
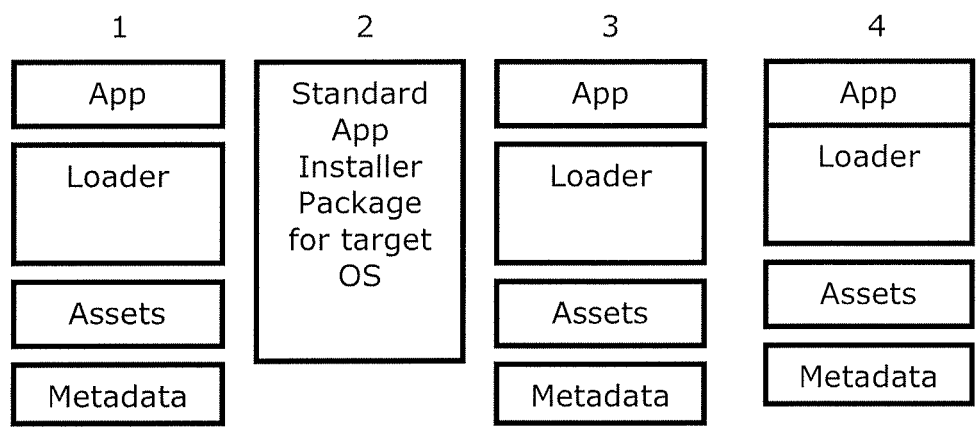
FIG. 3B is a flow diagram showing deployment of an application in which a Loader is dynamically linked to an App Binary at execution time.

Referring now to FIG. 3B of the accompanying drawings, an App Binary can be dynamically linked to the Loader at execution time as follows:

1. The App Binary, Loader, Assets and Metadata (as defined in FIG. 3A) are all placed alongside one another. Note that no linkage is created between the App Binary and Loader.

2. Using the same process described in FIG. 3A, step 4, these components are packaged together into a standard application installer package for the target OS, and installed on the target device, either through direct deployment or via some distribution mechanism such as an "app store".

3. When the package is installed onto the device, the components parts (App Binary, Loader, Assets and Metadata) once again end up alongside one another, usually in uncompressed form.

4. The Loader is actually the executable app, as understood by the OS. Upon execution, the Loader performs the steps FA, FC, FD described earlier, and the App Binary is dynamically linked to the Loader.

Deployment with Loader Already Resident on Target Device

Figure 3C:
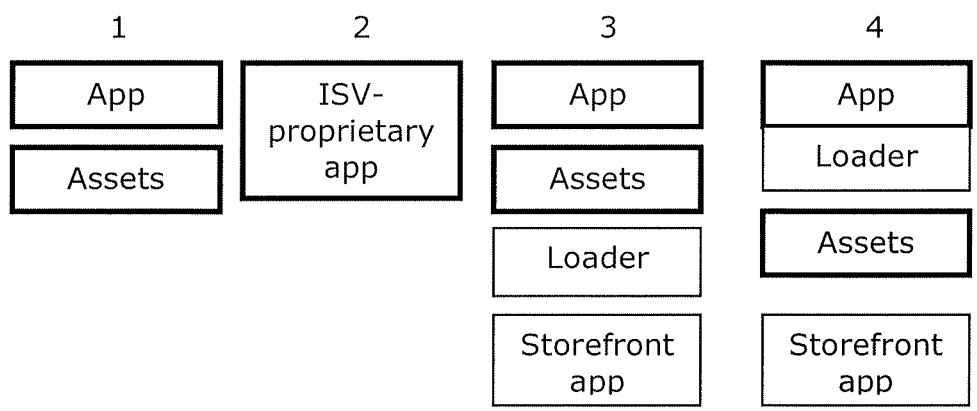
FIG. 3C is a flow diagram showing deployment of an application when a Loader is already resident on a target device.

Referring now to FIG. 3C of the accompanying drawings, an App Binary can be linked to the Loader on a target device if the Loader is already resident on the target device as follows:

1. In this arrangement, the target device already has a resident Loader that is capable of linking against an App Binary. This Loader is contained as part of a single executable application on the target device, such as a "Storefront" app, that is used to download and execute multiple other applications created using the ISV SDK. Therefore, for each further application to be delivered to the device, only the App Binary and Assets are required.

2. The App Binary and Assets are grouped together in an ISV package file, for instance a ZIP file.

3. The ISV package file is delivered to the device, perhaps as a download process initiated by the Storefront app, so that the App Binary and Assets are alongside each other. The Storefront application and Loader as already resident on the device.

4. The delivered application is usually executed as an action within the Storefront application itself. The Storefront application can ask the Loader to link and execute the App Binary, just as if the delivered application were executed from the device desktop. The Loader then performs a dynamic link and executes the application as shown in FIG. 3B.

Specific Example of Application Creation and Deployment

Next a specific example will be described in which an application is created and deployed. The application is a "Hello, World" example, being the industry-standard simplest code example for an SDK. The deployment targets will be an iOS device and an Android device.

In this example, the code is written purely in C, as below:

```
// Include header file for the OS abstractio
#include "s3e.h"
// Main entry point for the application
int main( )
    // Wait for a quit request from the host OS
    while (!s3eDeviceCheckQuitRequest( ))
    {
        // Fill background blue
        s3eSurfaceClear(0, 0, 255);
        // Print a line of debug text to the screen at top
        left (0, 0)
        // Starting the text with the ' (backtick) char
followed by 'x' and a hex value
        // determines the colour of the text.
        s3eDebugPrint(120, 150, "'xffffffHello, World!",
        0);
        // Flip the surface buffer to screen
        s3eSurfaceShow( );
        // Sleep for 0ms to allow the OS to process
        events etc.
        s3eDeviceYield(0);
    }
    // Exit the application
    return 0;
}
```

The OS abstraction API is known as the "S3E" API, and is described by the C header file "s3e.h". Function calls starting with the s3e prefix are calls to the OS abstraction API. This example contains only 5 function calls, all of them to the OS abstraction API. A short description of each of these follows:

s3eDeviceCheckQuitRequest

Check whether or not the application has been requested to quit (exit), either by the OS or the user.

s3eSurfaceClear

Clears the entire surface (i.e. the display, or "backbuffer") to a given colour.

s3eDebugPrint

Prints a text message on the current surface, using a standard simple font provided within the Loader.

s3eSurfaceShow

Displays the current surface to the device screen. Most systems employ a "double-buffering" system whereby the surface drawn to is not made visible on the screen until this function is called.

s3eDeviceYield

This also allows the OS to do any required processing for this application, for example processing device or user interface messages. It may also permit the CPU to enter a low-power state. The user can specify the amount of time to "yield" for; if this value is passed as zero, the Loader will yield for the minimum amount of time required by the underlying OS to perform essential processing.

As described earlier, the "main" function will become the single point of entry for the App Binary library. The five calls to the OS abstraction API will become the only external dependencies of the App Binary library.

Referring again to FIG. 2, the process of creating the App Binary is followed:

This single C source code file (HelloWorld.c) is compiled using the GCC ARM compiler to become a single binary object code file, HelloWorld.obj The GCC ARM linker takes all the application object files (in this case, there is only one) and links them together to form a single binary library file in standard ELF format, HelloWorld.elf The invention's "post-linker" tool converts HelloWorld.elf into the modified ELF file, HelloWorld.s3e In this specific example, a deployment environment is then initiated in which the developer deploys the same ELF file simultaneously to iOS and Android, as part of an application installer package for those platforms, as follows:

Developer selects both iOS and Android checkboxes within a graphical deployment tool.

For Android: the deployment scenario is that shown in FIG. 3B:

The App Binary has already been created as described above

The Loader for Android is provided as described above

The "Hello, World" requires no Assets, except for a default font, which is provided within the Loader Some Metadata elements are required for deployment to Android (including a desktop icon, and application description file AndroidManifest.xml); however, the embodiment of the invention provides defaults for these, so the developer is not absolutely required to provide them As shown in FIG. 3B, the App Binary, Loader, Assets (none) and Metadata are packaged into a standard Android "APK" file (Android's standard application installer format) using packaging tools provided within the Android SDK, and redistributed within the embodiment of the invention The APK file can then be installed onto an Android device, for example over a USB connection to the host PC. Once installed, the Loader is the main executable file, and it loads and links the App Binary, before jumping into the "main" entry point For iOS: the deployment scenario is that shown in FIG. 3A:

The App Binary has already been created as described above

The Loader for iOS is provided as described above

The "Hello, World" requires no Assets, except for a default font, which is provided within the Loader Some Metadata elements are required for deployment to iOS (including a desktop icon, and application description file info.plist); however, the embodiment of the invention provides defaults for these, so the developer is not absolutely required to provide them As shown in FIG. 3A, the embodiment of the invention statically links the App Binary with the Loader, into a single executable file. Together with the Assets (none) and Metadata these are packaged into a standard iOS "IPA" file (iOS's standard application installer format) using packaging and signing tools provided within the iOS SDK under permissive open source licenses, and recreated within the embodiment of the invention itself The IPA file can then be installed onto an iOS device, for example over a USB connection to the host PC, using Apple's "iTunes" application. Once installed, the Loader and App Binary have already been linked as a single executable file, and the "main" entry point is called It is to be appreciated that the embodiments of the invention described above enable source code to be written in a preferred language, compiled using a CPU-specific compiler and then published for execution on a plurality of different operating systems. This has the advantage of producing CPU-optimised code with minimal bugs.

Embodiments of the present invention may produce executable applications to run on devices such as mobile telephones, tablet computers, laptop computers, televisions or set-top boxes. Devices for use with embodiments of the invention may be embedded devices.

It is to be appreciated that some embodiments of the invention produce a single executable file or "app", whereas other embodiments of the invention produce an executable application which is composed of a collection of separate files.

It is to be appreciated that the arrangements described above enable source code to be written in a preferred language, compiled using a CPU-specific compiler and then published for execution on a plurality of different operating systems. This has the advantage of producing CPU-optimised code with minimal bugs.

The arrangements described above may produce executable applications to run on devices such as mobile telephones, tablet computers, laptop computers, televisions or set-top boxes. The devices may be embedded devices.

It is to be appreciated that the above arrangements can produce a single executable file or "app", whereas other arrangements produce an executable application which is composed of a collection of separate files.

The arrangements described above provide a mechanism for all OS dependencies to be separated into a binary form (the Loader) which is distinct from the core application (the App Binary). This leads to the possibility of executing the App Binary on a different CPU architecture from that of the Loader.

Embodiments of the present invention aim to provide value to application developers during the development and debugging of code destined to be deployed on remote devices. The "host" environment is the development environment, typically a desktop computer running Windows or OSX, and typically utilising an x86 CPU architecture. The "target" environments are the devices on which the application will be deployed; this may include mobile telephones, tablets, and TVs. The target environments typically do not utilise an x86 CPU architecture.

The most common application development scenario is that the App Binary is compiled for the host CPU architecture (typically x86), and the host Loader (typically compiled for x86, and running on Windows, OSX or Linux) dynamically links to and executes the App Binary. The App Binary makes function calls to the Loader through its external dependencies, namely the OS abstraction APIs.

Embodiments of the present invention seek to provide an additional scenario, whereby the App Binary is compiled for a different CPU architecture (typically ARM or MIPS). The host Loader remains the same (typically compiled for x86, and running on Windows, OSX or Linux), but instead of executing the App Binary by calling directly into its main entry point, it initialises a CPU emulation environment to start emulating the App Binary from the main entry point. Whenever the App Binary makes a call to the OS abstraction API, some mechanism is used (as supported by both the chosen emulation environment and the host environment) to pass execution through to the Loader. Once the Loader has completed execution of the OS abstraction API function, it passes execution back to the CPU emulation environment.

Embodiments of the invention offer a way for developers to test a substantial portion of the target application—the App Binary—within the host environment. This can save a large amount of time, as typically bugs specific to compilation for the target CPU architectures would only be discovered when the application was executed on the target devices, where debugging is a time-consuming experience. Embodiments of the invention allow the App Binary, compiled for the target CPU architectures, to be tested within the host environment, which typically provides a much more efficient debugging environment.

Next a specific example will be described, whereby the App Binary is running under emulation within a host environment. The host environment is a desktop PC, utilising the x86 CPU architecture and running the Windows OS. The emulation environment is QEMU (an open source project described here: http://wiki.qemu.org/Main_Page), configured to emulate the ARM architecture.

When running the App Binary under emulation, calls to the OS abstraction API are diverted such that each API call ends up writing to a specially-designated memory address. QEMU is configured so as to throw a CPU exception whenever this memory address is written. The CPU exception is trapped by the Loader, which is able to extract the functional arguments from QEMU's ARM register list, and invoke the relevant Loader OS abstraction function with the correct arguments. In this specific a scenario, a critical requirement is met whereby the QEMU emulation environment, and the Loader, share the same memory address space, and therefore memory pointers passed as functional arguments from the emulation environment are still meaningful within the Loader.

Once execution of the function has been completed within the Loader, the function return value is copied into the relevant QEMU ARM register, and the emulation environment is invoked once more to continue emulation.

Figure 4:
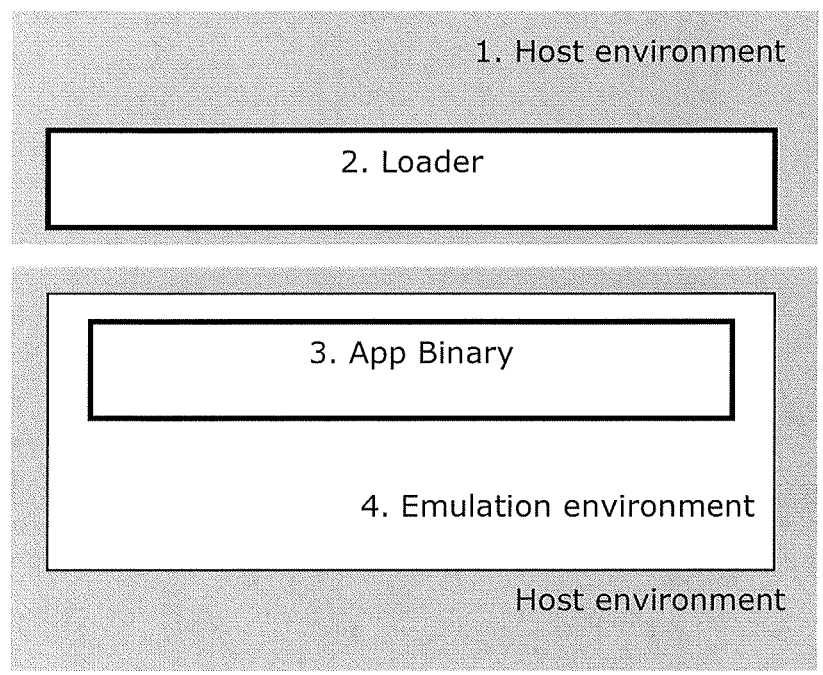
FIG. 4 is a schematic diagram showing an embodiment of the invention in which a Loader is running in a host environment and an App Binary is running under emulation.

Referring now to FIG. 4 of the accompanying drawings:

1. The host environment is the standard environment for application development, typically a Windows or OSX environment running on x86

2. The Loader is the standard Loader for the host environment, typically a Windows Loader running on x86

Figure 5B:
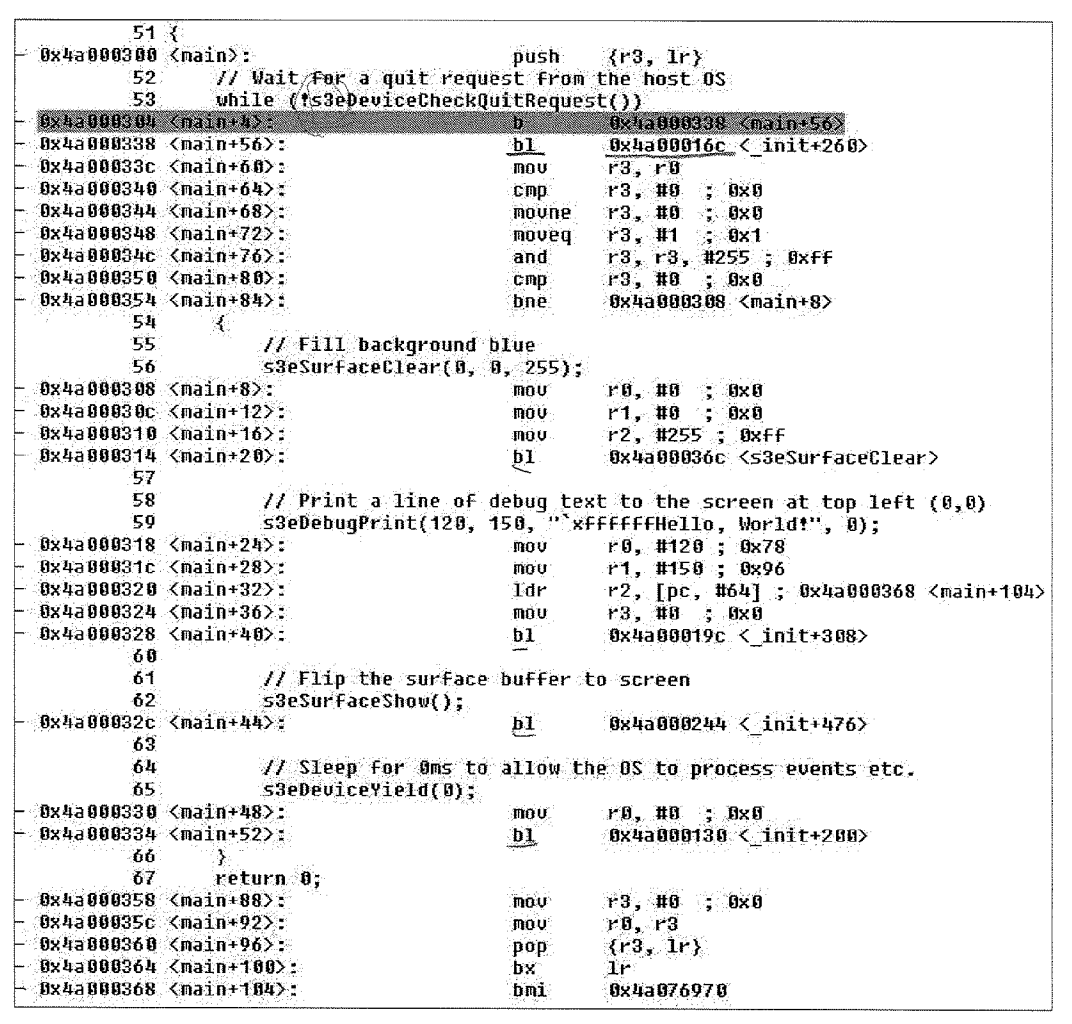

3. The App Binary has been compiled for the target CPU architecture, typically ARM or MIPS 4. The emulation environment is a CPU emulation environment, typically provided by a $3^{rd}$ party, and potentially modified to support the architecture of the invention 5. The emulation environment itself runs within the host environment Referring now to FIGS. 5A and 5B of the accompanying drawings:

1. The source code of the application contains 5 function calls to the OS abstraction API—these are the function calls with the "s3e" prefix 2. The disassembly of the App Binary compiled for ARM shows how the lines of source code become ARM CPU instructions. Each of the 5 boxes containing a "b1 . . . " instruction corresponds to 1 of the 5 function calls to the OS abstraction API. For example, the ARM CPU instruction "b1 0x4a00016c" corresponds to the call to the function "s3eDeviceCheckQuitRequest". Assuming the same implementation system as described in the Specific Example above, the QEMU emulation environment will emulate the ARM CPU instructions up to and including this instruction; the ARM code jumped to by the "b1" instruction does not contain an implementation of the "s3eDeviceCheckQuitRequest" function, rather it contains ARM code provided by the embodiment of the invention, that writes to a specific memory address that has been "trapped" by the Loader; the Loader (running in the host environment, that is Windows running on x86) catches this exception, extracts any function call arguments (in this case, there are none) from the QEMU environment, and invokes the host environment (Windows running on x86) implementation of the "s3eDeviceCheckQuitRequest" function (which will return "true" if the user has closed down the application within the host environment, for example by clicking the standard Windows application exit button); once the "s3eDeviceCheckQuitRequest" function has been completed within the host environment, the Loader invokes the QEMU environment to continue emulated execution from the next ARM instruction (in this case, the instruction "mov r3, r0"); emulated execution then continues until the next disassembled "s3e" function (i.e. the next "b1 . . . " instruction), at which point a similar pattern is repeated The specific example described above illustrates how embodiments of the invention enable an application to be executed on a host system so that the application can be easily tested by the developer.

It is to be appreciated that embodiments of the invention may incorporate the method steps and system features which enable a developer to produce an application.

The arrangements described above provide a mechanism for all OS dependencies to be separated into a binary form (the Loader) which is distinct from the core application (the App Binary). This leads to the possibility of executing a Loader and App Binary within the host development environment, whilst at the same time executing a Loader within a target device environment, such that the Loader within the host development environment can retrieve information from the Loader within the target device environment.

Embodiments of the present invention aim to provide value to application developers during the development and debugging of code destined to be deployed on remote devices. The "host" system or environment is the development environment, typically a desktop computer running Windows or OSX, and typically utilising an x86 CPU architecture. The "target" device or environments are the devices on which the application will be deployed; this may include mobile telephones, tablets, and TVs. The target environments typically do not utilise an x86 CPU architecture.

The most common application development scenario is that the App Binary is compiled for the host CPU architecture (typically x86), and the host Loader (typically compiled for x86, and running on Windows, OSX or Linux) dynamically links to and executes the App Binary. The App Binary makes function calls to the Loader through its external dependencies, namely the OS abstraction APIs.

Embodiments of the present invention seek to extend this scenario, whereby a target device running a target Loader module appropriate for that device is connected to the host Loader module of the host environment through a target interface module in the form of an application running on the target device. In an alternative embodiment the target device may only be provided with a target interface module and not a target Loader module. The host Loader remains the same (typically compiled for x86, and running on Windows, OSX or Linux). Whenever the App Binary (running within the host environment) makes a function call (functional command) to the OS abstraction API, the host environment Loader checks to see if a target device is connected to the host environment in such a way that this particular function call should be re-routed to the target device. This connection is preferably established in advance, for example by running a Remote Client application on the target device, and having both the host environment Loader and the Remote Client application broadcast their availability over a local wireless network. If such a communication link exists, and the host environment has been configured to re-route this particular function call remotely, then the host environment Loader issues a command to the Remote Client application to execute the function call using the target device Loader, and return the result value to the host environment Loader. This result value is subsequently returned to the App Binary (running within the host environment).

The issuing of the command to the Remote Client, and the returning of the resulting value(s), is typically done using standard network communication protocols such as sending to and receiving from network sockets. As far as the App Binary is concerned, the function call was executed by the host environment Loader, and it has no knowledge of whether the function was evaluated purely within the host environment Loader, or by delegation to any target device. This mechanism is known as a "Remote Procedure Call" (RPC).

In embodiments of the invention the target device is preferably configured to receive at least one input. The target device preferably uses the at least one input to generate a result value.

To receive the or each input, the target device preferably incorporates a touchscreen, at least one button, a microphone or a sensor such as an accelerometer, a positioning sensor, a proximity sensor, a magnetometer, a thermometer or a video camera.

Embodiments of the invention offer a way for developers to test the target application within the host environment but using inputs from connected target devices. This can save a large amount of time, as typically issues relating to user interfaces can only be tested using the hardware form factors of the target devices. Embodiments of the invention allow the user interface to be tested using the target device form factors whilst still keeping the App Binary execution within the host environment which typically provides a much more efficient debugging environment.

In order to ensure that the user interface inputs received from the target device are as consistent as possible with those received if the entire application were executing on the target device, the visual display produced by the application running within the host environment is preferably sent over the network connection to the target device, so that the visual display of the target device matches that of the host environment.

Next a specific example will be described. The host environment is a desktop PC, utilising the x86 CPU architecture and running the Windows OS. The target device is a mobile tablet, utilising the ARM architecture and running the Android OS.

Figure 6:
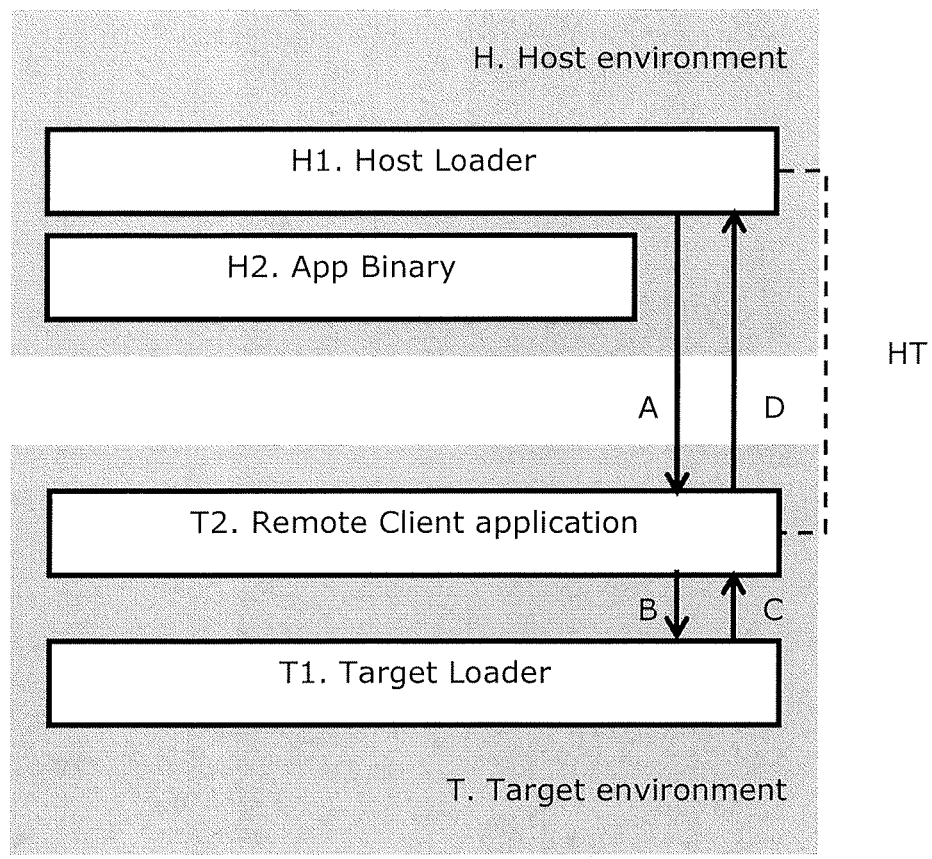
FIG. 6 is a schematic diagram showing an embodiment of the invention in which a Loader is running in a host environment and a Remote Client application is running on a target device.

Referring now to FIG. 6 of the accompanying drawings:

H. The host environment is the standard environment for application development, typically a Windows or OSX environment running on x86

H1. The host environment Loader is the standard Loader for the host environment, typically a Windows Loader running on x86

H2. The App Binary has been compiled for the host CPU architecture, typically x86

T. The target device is typically a mobile device, in this case we assume running the Android OS within an ARM CPU architecture T1. The target device Loader is the standard Loader for the target environment, in this case the Android Loader for ARM T2. The Remote Client application is a target device interface module which allows connection to the host environment Loader and communication between the two Loaders HT. The Remote Client application and the host environment Loader communicate via a network connection, typically a local wireless network or a wired communication link In this specific example, the App Binary may be compiled from the following source code:

```
#include "s3eAccelerometer.h"
// Main entry point for the application
int main( )
{
    // Start the abstraction layer's accelerometer subsystem
    s3eAccelerometerStart( );
    // Wait for a quit request from the host OS
    while (!s3eDeviceCheckQuitRequest( ))
    {
        // Get the accelerometer X, Y, Z values
        int x = s3eAccelerometerGetX( );
        int y = s3eAccelerometerGetY( );
        int z = s3eAccelerometerGetZ( );
        // Display the X, Y, Z values
        s3eDebugPrint(10, 10, 1, "'x666666X: %3d Y: %3d Z: %d", x, y, z);
    }
    // Stop the abstraction layer's accelerometer subsystem
    s3eAccelerometerStop( );
    return 0;
}
```

The Remote Client application (T2) has been deployed to the target device and executed. The host environment Loader (H1) contains a graphical user interface allowing the developer to search for target devices on available network connections that might be running the Remote Client application. When the target device in question has been found, the host environment Loader and Remote Client application can now communicate over the network connection (HT).

The flow of execution of the App Binary can be examined by considering each line of the source code in turn:

"main( )"—this entry point function is first called when the App Binary (H2) is first executed within the host environment "s3eAccelerometerStart( )"—the App Binary makes this call to the OS abstraction API. The host environment Loader receives this call, but the host environment has been configured so as to re-route this call to the target device. Using the HT connection, the host environment Loader sends the function name plus any function input values (in this case there are none) to the Remote Client application (A). The Remote Client application makes the same function call (B) to the target device Loader, and passes in the same function input values (in this case there are none). The target device Loader executes the function, and passes any return value back (C) to the Remote Device application, which uses the HT connection to pass this same result back (D) to the host environment Loader, which passes the same return value back to the App Binary. As far as the App Binary is concerned, the function was executed within the host environment Loader, and it has no knowledge of the connected target device "s3eDeviceCheckQuitRequest"—the App Binary makes this call to the OS abstraction API. The host environment Loader receives this call, and the host environment has not been configured to re-route this call to the target device. The host environment Loader executes this function as normal (in this case, checking whether the host environment has received a request to quit the application, for example by closing the application window)

"s3eAccelerometerGetX( ), GetY( ), GetZ( )"—the App Binary makes these calls to the OS abstraction API. The host environment Loader receives these calls, but the host environment has been configured so as to re-route these calls to the target device. The flow of communication and execution is the same as for "s3eAccelerometerStart( )", noting that in these cases the function calls do return a value, which is ultimately returned to the host environment Loader and thereafter to the App Binary "s3eDebugPrint"—this executes as normal within the host environment Loader "s3eAccelerometerStop( )"—this executes analogously to the call to s3eAccelerometerStart( )

The specific example described above illustrates how embodiments of the invention enable an application to be executed on a host system whilst receiving inputs from a target device, so that the application can be easily tested and debugged by the developer without ignoring the specific user interface facilities and constraints of the target devices.

It is to be appreciated that embodiments of the invention may incorporate the method steps and system features which enable a developer to produce an application.

When used in this specification and claims, the terms "comprises" and "comprising" and variations thereof mean that the specified features, steps or integers are included. The terms are not to be interpreted to exclude the presence of other features, steps or components.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

The invention claimed is:

1. A method of producing an executable application, the method comprising:
    selecting a central processing unit (CPU) type,
    generating an operating system agnostic code module comprising native CPU instructions for the selected CPU type by:
        compiling the native CPU instructions from source code using a compiler for the selected CPU type,
        using an object file linker to link a machine code object file into a binary library file in an executable and linkable format, and
        modifying the executable and linkable format library file into a format suitable for linking with a loader module,
    selecting an operating system,
    providing the loader module for execution by the selected operating system, and
    packaging the loader module with the code module to form an executable application so that, when the executable application is provided on a device incorporating CPU of the selected CPU type and running the selected operating system, the device can execute the executable application to execute the loader module to load the code module for execution by the CPU.

2. The method of claim 1, wherein the method further comprises:
linking the code module to the loader module.

3. The method of claim 2, wherein the linking occurs before or at the same time as the loader module is packaged with the code module to form an executable application.

4. The method of claim 3, wherein the method further comprises:
copying the executable application to a device, and wherein the linking occurs each time the executable application is executed on the device.

5. The method of claim 1, wherein the method further comprises:
copying the executable application to a device.

6. The method of claim 3, wherein the linking links the code module to an operating system abstraction application programming interface provided in the loader module.

7. The method of claim 3, wherein the linking links the code module to one or more device drivers.

8. The method of claim 1 wherein the method further comprises:
generating a loader module for each respective selected operating system.

9. The method of claim 8, wherein generating each loader module comprises incorporating an operating system abstraction application programming interface header.

10. The method of claim 8, wherein generating each loader module comprises incorporating generic functional code which can be executed by more than one operating system.

11. The method of claim 8, wherein generating each loader module comprises incorporating functional code which is specific to the selected operating system.

12. The method of claim 1, wherein the code module incorporates a single function entry point to initiate execution of the code module.

13. The method of claim 1, wherein the code module has an external dependency to an operating system abstraction application programming interface.

14. The method of claim 1, wherein the code module has an external dependency on at least one device driver.

15. The method of claim 1, wherein the step of packaging comprises storing the code module with the loader module in a single executable application file.

16. The method of claim 15, wherein the step of packaging further comprises storing application assets in.

17. The method of claim 15, wherein the step of packaging further comprises storing metadata in the single executable application file.

18. The method of claim 1, wherein the CPU type is a CPU type selected from a group consisting of an Intel x86 architecture, an ARM architecture and a MIPS architecture.

19. The method of claim 1, wherein the operating system is selected from a group consisting of a Linux-based operating system, an Android operating system, a MeeGo operating system, a Windows operating system and an iOS operating system.

20. A system for producing an executable application, the system comprising a non-transitory computer readable medium storing executable instructions which, when executed by a processor, provide:
an interface for selecting a central processing unit (CPU) type and an operating system,
a compiler configured to generate an operating system agnostic code module comprising native CPU instructions for the CPU type selected using the interface by:
compiling the native CPU instructions from source code using the compiler for the selected CPU type,
using an object file linker to link a machine code object file into a binary library file in an executable and linkable format, and
modifying the executable and linkable format library file into a format suitable for linking with a loader module,
a storage module for storing the loader module configured for execution by the operating system selected using the interface, and
a packaging module for packaging the loader module with the code module to form an executable application so that, when the executable application is provided on a device incorporating a CPU of the selected CPU type and running the selected operating system, the device can execute the executable application to execute the loader module to load the code module for execution by the CPU.

21. The system of claim 20, wherein the non-transitory computer readable medium stores executable instructions which, when executed by a processor, provide:
a linker module which is configured to link the code module to the loader module.

22. A device comprising a computer-readable memory storing at least one executable application produced in accordance with the method of claim 1.

23. The device of claim 22, wherein the device is a device selected from a group consisting of a mobile telephone, a tablet computer, a laptop computer, a television and a set-top box.

* * * * *